("12") United States Patent
Thompson et al.

(10) Patent No.: US 10,608,443 B2
(45) Date of Patent: Mar. 31, 2020

(54) BATTERY MANAGEMENT USING BATTERY TEMPERATURE DISTRIBUTION

(71) Applicant: Dell Products L.P., Round Rock, TX (US)

(72) Inventors: Richard Christopher Thompson, Cedar Park, TX (US); Bruce Alan Miller, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 15/677,988

(22) Filed: Aug. 15, 2017

(65) Prior Publication Data
US 2019/0058336 A1    Feb. 21, 2019

(51) Int. Cl.
*H02J 7/00* (2006.01)
*G05B 19/048* (2006.01)
(Continued)

(52) U.S. Cl.
CPC ............ *H02J 7/0021* (2013.01); *B60L 58/12* (2019.02); *G05B 19/048* (2013.01);
(Continued)

(58) Field of Classification Search
CPC ........ H02J 7/0021; H02J 7/0047; H02J 7/007; H02J 2007/0049; H02J 2007/005;
(Continued)

(56) References Cited

U.S. PATENT DOCUMENTS

| 4,672,228 A | 6/1987 | Swoboda |
| 5,598,327 A | 1/1997 | Somerville et al. |

(Continued)

OTHER PUBLICATIONS

UEFI, "Unified Extensible Firmware Interface (UEFI) Specification", Retrieved from <http://uefi.org> May 2017; 2899 pages, Jun. 28, 2017.
(Continued)

*Primary Examiner* — James J Lee
*Assistant Examiner* — Michael W Choi
(74) *Attorney, Agent, or Firm* — Baker Botts L.L.P.

(57) ABSTRACT

An information handling system may include a main processor, a battery, multiple temperature sensors for obtaining temperature values associated with the battery, a processor, and memory media accessible to the processor. The memory media may store instructions executable by the processor for receiving a respective temperature value from each of the temperature sensors and calculating a battery temperature distribution value dependent on the received temperature values, including determining a difference between two temperature values. The instructions may be further executable for determining a respective value for each of one or more battery control parameters dependent on the battery temperature distribution value, and setting each of the battery control parameters to the determined value. Determining the control parameters values may be further dependent on the rate of change of the difference between the two temperature values, or on whether the received temperatures or the temperature difference lie outside a predetermined range.

17 Claims, 4 Drawing Sheets

(51) Int. Cl.
*H01M 10/48* (2006.01)
*H01M 10/44* (2006.01)
*G05B 19/042* (2006.01)
*B60L 58/12* (2019.01)
*H01M 10/42* (2006.01)

(52) U.S. Cl.
CPC ...... *G05B 19/0428* (2013.01); *H01M 10/441* (2013.01); *H01M 10/443* (2013.01); *H01M 10/482* (2013.01); *H01M 10/486* (2013.01); *H02J 7/007* (2013.01); *H02J 7/0047* (2013.01); *G05B 2219/24015* (2013.01); *H01M 2010/4271* (2013.01); *H01M 2010/4278* (2013.01); *H02J 2007/005* (2013.01); *H02J 2007/0049* (2013.01)

(58) Field of Classification Search
CPC ........ G05B 19/048; G05B 2219/24015; G05B 19/0428; B60L 58/12; H01M 10/441; H01M 10/443; H01M 10/482; H01M 10/486; H01M 2010/4271; H01M 2010/4278
USPC ........................................................ 700/295
See application file for complete search history.

(56) References Cited

U.S. PATENT DOCUMENTS

| | | | |
|---|---|---|---|
| 5,811,895 A | 9/1998 | Suzuki et al. | |
| 6,057,609 A | 5/2000 | Nagai et al. | |
| 6,293,700 B1 | 9/2001 | Lund et al. | |
| 6,477,054 B1 | 11/2002 | Hagerup | |
| 7,127,228 B2 | 10/2006 | Chang et al. | |
| 7,243,246 B2 | 7/2007 | Allen et al. | |
| 7,536,569 B2 | 5/2009 | Montero et al. | |
| 7,538,518 B2 | 5/2009 | Wang et al. | |
| 7,545,120 B2 | 6/2009 | Breen et al. | |
| 7,592,716 B2 | 9/2009 | Zhu et al. | |
| 7,989,981 B2 | 8/2011 | Zhang | |
| 8,164,904 B2 | 4/2012 | Matz et al. | |
| 8,188,594 B2 | 5/2012 | Ganesan et al. | |
| 9,166,083 B2 | 10/2015 | Meinel et al. | |
| 9,197,092 B2 | 11/2015 | Verdun et al. | |
| 9,263,912 B2 | 2/2016 | Verdun et al. | |
| 9,300,015 B2 | 3/2016 | Chang et al. | |
| 9,524,018 B2 | 12/2016 | Sultenfuss et al. | |
| 9,568,990 B2 | 2/2017 | Chueh et al. | |
| 9,681,558 B2 | 6/2017 | Chen et al. | |
| 9,693,446 B2 | 6/2017 | Ragg | |
| 9,812,878 B1 | 11/2017 | Stieber et al. | |
| 9,867,275 B2 | 1/2018 | Chen | |
| 9,887,571 B1 | 2/2018 | Sultenfuss et al. | |
| 10,128,764 B1 | 11/2018 | Vinciarelli | |
| 10,181,731 B1 | 1/2019 | Thompson et al. | |
| 10,181,739 B1 | 1/2019 | Thompson et al. | |
| 2003/0085626 A1 | 5/2003 | Odaohhara | |
| 2003/0212923 A1 | 11/2003 | Coppock et al. | |
| 2004/0075418 A1 | 4/2004 | Densham et al. | |
| 2004/0125618 A1 | 7/2004 | Rooij et al. | |
| 2004/0135565 A1 | 7/2004 | Douma et al. | |
| 2005/0052164 A1 | 3/2005 | Sakai et al. | |
| 2005/0125709 A1 | 6/2005 | McKim | |
| 2005/0131645 A1 | 6/2005 | Panopoulos | |
| 2005/0174094 A1 | 8/2005 | Purdy et al. | |
| 2005/0275383 A1* | 12/2005 | Ishishita | G01K 15/00 320/150 |
| 2006/0022637 A1 | 2/2006 | Wang et al. | |
| 2006/0164038 A1 | 7/2006 | Demers et al. | |
| 2007/0079153 A1 | 4/2007 | Bain et al. | |
| 2007/0103110 A1 | 5/2007 | Sagoo | |
| 2007/0200433 A1 | 8/2007 | Kelty | |
| 2007/0248877 A1 | 10/2007 | Qahoug | |
| 2007/0279004 A1 | 12/2007 | Wang et al. | |
| 2008/0222431 A1 | 9/2008 | Paniagua et al. | |
| 2008/0278111 A1* | 11/2008 | Genies | H02J 7/0073 320/101 |
| 2008/0315826 A1 | 12/2008 | Alberth, Jr. et al. | |
| 2009/0001937 A1 | 1/2009 | Densham et al. | |
| 2009/0076661 A1 | 3/2009 | Pearson et al. | |
| 2009/0146826 A1 | 6/2009 | Gofman et al. | |
| 2009/0177906 A1 | 7/2009 | Paniagua, Jr. et al. | |
| 2009/0244944 A1 | 10/2009 | Jang et al. | |
| 2010/0038963 A1 | 2/2010 | Shetty et al. | |
| 2010/0067197 A1 | 3/2010 | Guccione et al. | |
| 2011/0068626 A1 | 3/2011 | Terlizzi et al. | |
| 2011/0225073 A1 | 9/2011 | Won et al. | |
| 2011/0227407 A1 | 9/2011 | Ransom | |
| 2011/0260681 A1 | 10/2011 | Guccione et al. | |
| 2012/0025630 A1 | 2/2012 | Tsuda | |
| 2012/0084575 A1 | 4/2012 | Flores et al. | |
| 2012/0091815 A1 | 4/2012 | Richards, III | |
| 2012/0123604 A1 | 5/2012 | Littrell | |
| 2012/0151240 A1 | 6/2012 | Robinson et al. | |
| 2012/0181990 A1 | 7/2012 | Asakura et al. | |
| 2012/0201062 A1 | 8/2012 | Lee | |
| 2012/0256484 A1 | 10/2012 | Kemp | |
| 2012/0316695 A1 | 12/2012 | Chen | |
| 2012/0319656 A1 | 12/2012 | Toma | |
| 2013/0043827 A1 | 2/2013 | Weinstein et al. | |
| 2013/0100568 A1 | 4/2013 | Mistry et al. | |
| 2013/0159792 A1 | 6/2013 | Brooks et al. | |
| 2013/0314039 A1 | 11/2013 | Weber et al. | |
| 2013/0342011 A1 | 12/2013 | Robinson et al. | |
| 2014/0018969 A1 | 1/2014 | Forbes | |
| 2014/0035380 A1 | 2/2014 | Stevens et al. | |
| 2014/0157065 A1 | 6/2014 | Ong | |
| 2014/0210267 A1 | 7/2014 | Ishida et al. | |
| 2014/0214223 A1 | 7/2014 | Tsunoda et al. | |
| 2014/0217958 A1 | 8/2014 | Verdun et al. | |
| 2014/0239882 A1 | 8/2014 | Yang | |
| 2015/0063473 A1 | 3/2015 | Nishibayashi | |
| 2015/0132615 A1* | 5/2015 | Yun | H01M 10/486 429/50 |
| 2015/0165917 A1 | 6/2015 | Robers et al. | |
| 2015/0364921 A1 | 12/2015 | Tatsuta et al. | |
| 2016/0099608 A1 | 4/2016 | Jao et al. | |
| 2016/0241148 A1 | 8/2016 | Kizilyalli et al. | |
| 2016/0246316 A1 | 8/2016 | Lim et al. | |
| 2016/0274607 A1 | 9/2016 | Kudo | |
| 2016/0329612 A1 | 11/2016 | Jung | |
| 2016/0359426 A1 | 12/2016 | Jitaru et al. | |
| 2017/0040815 A1 | 2/2017 | Todasco | |
| 2017/0085098 A1 | 3/2017 | Sporck et al. | |
| 2017/0104330 A1 | 4/2017 | Nakaishi | |
| 2017/0177069 A1 | 6/2017 | Bedare et al. | |
| 2017/0225586 A1 | 8/2017 | Zhang et al. | |
| 2018/0181171 A1* | 6/2018 | Jang | G06F 1/203 |
| 2018/0233914 A1 | 8/2018 | Miki et al. | |
| 2018/0351399 A1 | 12/2018 | Frey | |
| 2018/0375358 A1 | 12/2018 | Sultenfuss et al. | |
| 2018/0375359 A1 | 12/2018 | Sultenfuss et al. | |
| 2018/0375360 A1 | 12/2018 | Sultenfuss et al. | |
| 2018/0375361 A1 | 12/2018 | Sultenfuss et al. | |
| 2019/0050037 A1 | 2/2019 | Wang et al. | |

OTHER PUBLICATIONS

Universal Serial Bus, "USB Power Delivery." Retrieved from <http://www.usb.org/developers/powerdelivery/> on Jun. 28, 2017; 3 pages.
SMBus, "System Management Bus (SMBus)." Retrieved from <www.smbus.org> on Jun. 28, 2017; 2 pages.
Wikipedia, "USB." Retrieved from <https://en.wikipedia.org/wiki/USB> on Mar. 19, 2017; 35 pages.
Waffenschmidt, Eberhard. "Qi Coupling Factor." Qi Coupling Factor, www.wirelesspowerconsortium.com/technology/coupling-factor.html, Retrieved Jan. 3, 2018; 5 pages.
Waffenschmidt, Eberhard. "Resonant Coupling." Resonant Coupling, https://www.wirelesspowerconsortium.com/technology/resonant-coupling.html; Retrieved Jan. 3, 2018; 4 pages.
Wow! A true free-positioning 5-phone charger—Wireless Power Consortium Blog. Wireless Power Consortium. Web. <http://www.

(56) References Cited

OTHER PUBLICATIONS wirelesspowerconsortium.com/blog/67/wow-a-true-free-positioning-5-phone-charger>; Retrieved Jan. 3, 2018; 6 pages.
Received STIC search report from EIC 2800 searcher John DiGeronimo dated Dec. 7, 2017; 31 pages.
Received STIC search report from EIC 2800 searcher Benjamin Martin dated Sep. 28, 2017; 14 pages.

* cited by examiner

BATTERY MANAGEMENT USING BATTERY TEMPERATURE DISTRIBUTION

BACKGROUND

Field of the Disclosure

This disclosure relates generally to information handling systems and, more particularly, to battery management for portable information handling systems using battery temperature distribution.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed information handling system includes a main processor, a battery, a plurality of temperature sensors for obtaining temperature values associated with the battery, an embedded controller (EC) comprising an EC processor, and memory media accessible to the EC processor. The memory media may store instructions executable by the EC processor for receiving a respective temperature value from each of the plurality of temperature sensors, calculating a battery temperature distribution value dependent on the received temperature values, the calculating comprising determining a difference between two temperature values, at least one of which is one of the received temperature values, determining a respective value for each of one or more battery control parameters dependent on the battery temperature distribution value, and setting each of the one or more battery control parameters to the determined respective value.

In any of the disclosed embodiments of the information handling system, calculating the battery temperature distribution value may include determining a difference between a maximum temperature value among the received temperature values and a minimum temperature value among the received temperature values.

In any of the disclosed embodiments, calculating the battery temperature distribution value may include determining a difference between one of the received temperature values and a reference temperature value.

In any of the disclosed embodiments, calculating the battery temperature distribution value may further include determining a rate of change in the difference between the two temperature values.

In any of the disclosed embodiments, determining a respective value for each of the one or more battery control parameters may be further dependent on whether the difference between the two temperature values lies between a first predetermined threshold difference value and a second predetermined threshold difference value.

In any of the disclosed embodiments, determining a respective value for each of the one or more battery control parameters may be further dependent on whether the difference between the two temperature values exceeds a predetermined threshold difference value.

In any of the disclosed embodiments, determining a respective value for each of the one or more battery control parameters may include at least one of determining a value for a battery operating mode parameter indicating that the battery is to operate in a charge mode, determining a value for a battery operating mode parameter indicating that the battery is to operate in a discharge mode, determining a value of a parameter controlling a charge rate for the battery, determining a value of a parameter controlling a discharge rate for the battery, determining a value of a parameter controlling a charging voltage for the battery, and determining a value of a parameter controlling a charging current for the battery.

In any of the disclosed embodiments, determining a respective value for each of the one or more battery control parameters may be further dependent on whether the received temperatures values lie outside a predetermined temperature range.

In any of the disclosed embodiments, the sensors may be distributed with respect to their positions relative to a surface of the battery.

In any of the disclosed embodiments, the battery may include multiple battery cells, and each of the plurality of sensors may be positioned to obtain a temperature value associated with a respective one of the battery cells.

In a further aspect, a disclosed method is for battery management. The method may include receiving a respective temperature value associated with a battery from each of a plurality of temperature sensors, calculating a battery temperature distribution value dependent on the received temperature values, the calculating comprising determining a difference between two temperature values, at least one of which is one of the received temperature values, determining a respective value for each of one or more battery control parameters dependent on the battery temperature distribution value, and setting each of the one or more battery control parameters to the determined respective value.

In any of the disclosed embodiments of the method, calculating the battery temperature distribution value may further include determining a rate of change in the difference between the two temperature values.

In any of the disclosed embodiments, determining a respective value for each of the one or more battery control parameters may further include determining whether the difference between the two temperature values lies between a first predetermined threshold difference value and a second predetermined threshold difference value.

In any of the disclosed embodiments, determining a respective value for each of the one or more battery control parameters may further include determining whether the difference between the two temperature values exceeds a predetermined threshold difference value.

In any of the disclosed embodiments, determining a respective value for each of the one or more battery control parameters may further include determining whether the received temperatures values lie outside a predetermined temperature range.

In any of the disclosed embodiments, the battery may be an internal battery of an information handling system or a battery within a power storage adapter coupled to the information handling system.

In a further aspect, a disclosed non-transitory computer readable memory media may store instructions executable by a processor for receiving a respective temperature value associated with a battery from each of a plurality of temperature sensors, calculating a battery temperature distribution value dependent on the received temperature values, the calculating comprising determining a difference between two temperature values, at least one of which is one of the received temperature values, determining a respective value for each of one or more battery control parameters dependent on the battery temperature distribution value, and setting each of the one or more battery control parameters to the determined respective value.

In any of the disclosed embodiments of the memory media, calculating the battery temperature distribution value may further include determining a rate of change in the difference between the two temperature values.

In any of the disclosed embodiments, determining a respective value for each of the one or more battery control parameters may further include determining whether the difference between the two temperature values exceeds a predetermined threshold difference value.

In any of the disclosed embodiments, determining a respective value for each of the one or more battery control parameters may further include determining whether the received temperatures values lie outside a predetermined temperature range.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
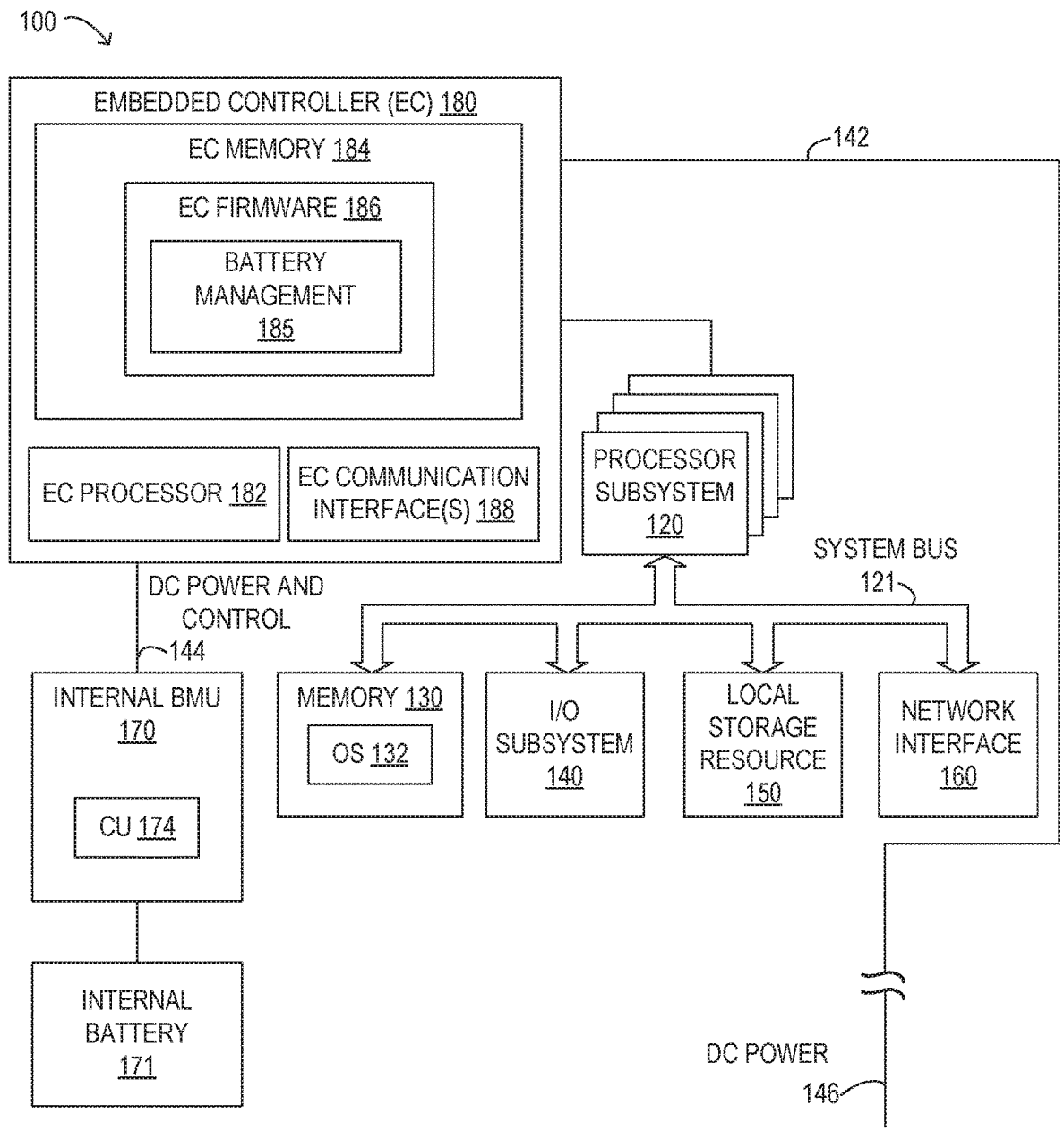
FIG. 1 is a block diagram illustrating selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

In portable information handling systems, battery wear out is an issue that concerns customers. Preventing wear out becomes increasingly important as information handling systems transition to designs that include non-removable batteries. Battery performance and battery cycle life have been shown to be dependent on battery temperature. Battery charging time may also be affected by battery temperature. Some existing information handling systems include removable batteries that are housed in a separate enclosure, thus providing physical separation from system heat sources and other system components.

Some smart batteries have the ability to monitor and control themselves based on battery temperature measurements. If the measured temperature values are within limits, the battery operates normally. Otherwise, certain battery operations may be limited or suspended. For example, some types of operations may be limited or suspended when the battery is too cold, while other types of operations may be limited or suspended when the battery is too hot. In existing systems, these decisions are typically based on a single point measurement of temperature for a battery, battery pack, or battery cell.

In one example, the manual for an information handling system battery may specify the following operating parameters:

Battery temperature range for initiating charging: minimum 0° C., maximum 50° C.

Upper limit for battery charging: 60° C.

Battery temperature range for normal discharging: minimum 0° C., maximum 60° C.

Battery temperature range to set over heat status: minimum 61° C., maximum 70° C.

Battery temperature above which over temperature protection is initiated and the battery does not allow discharge: 70° C.

In some information handling systems, there may be large variations in temperatures measured by different sensors associated with a battery. For example, there may be large variations in the temperature measurements taken at different positions over the surface of the battery relative to each other and/or relative to a reference temperature. In another example, there may be large variations in temperature measurements associated with different cells of the battery relative to each other and/or relative to a reference temperature. Large differences in the temperature between cells in a battery, or over the surface of a battery (or a single cell thereof) can lead to an accelerated or unpredictable wearing out of the battery. Some existing information handling system designs include fans, heat spreaders, or cooling plates in an attempt to eliminate large variations in temperature.

As consumer electronics designs have focused on thin, small and light devices, a few trends have been observed that can lead to large temperature differences being associated with an information handling system battery. For example, some designs include embedded batteries, which eliminate the plastic enclosures and other means of physical separation between the battery and other system elements. In some designs, batteries occupy a large portion of the chassis footprint. For example, the use of thin battery pack designs can result in a significant portion of the chassis footprint being dedicated to the battery, such as 60% or more of the footprint in some in mobile phone and tablet designs.

In some information handling systems, the position of a battery (or battery pack) relative to other system elements may cause large variations in temperature across the battery (or battery pack). For example, some portions of a battery pack may be near heat generating elements, such as a processor or memory, while other portions of the battery pack may be in cooler areas, such as near an air vent, leading to a significant temperature gradient over the surface of the battery pack. Similarly, in systems in which wireless charging coils are placed on top of the battery pack, the particular arrangement of the batteries and the charging coils may result in temperature variations between different portions of the battery pack dependent on their proximity to the charging coil. In one example, there may be a difference of 12-15° C. between a temperature measurement taken near such a charging coil and a temperature measurement taken farther from the charging coil. In some cases, there may be large differences in the respective temperature measurements taken in proximity to different cells within a single battery, based on their locations within the system, their proximity to heating or cooling elements, or other factors. These and other design considerations affecting variations in temperature across a battery or battery pack may be further aggravated as component power density and/or thermal density continue to increase in the industry.

As previously noted, it has been shown that temperature affects battery performance and battery cycle life. Battery performance and battery cycle life may also be affected by the distribution or range of temperatures experienced across a battery or battery pack. Additional aspects of battery performance that may be impacted by battery temperature and battery temperature distribution or range include anode lithiation during charge, pulse handling-current density, or electrolyte distribution. For example, estimations of Life Performance Loss made by comparing battery life curves at different temperatures (e.g., at multiple temperatures between 25° C. vs. 60° C.) illustrate that capacity retention drops much more quickly when a battery is relatively hot than when it is cooler. In other words, the hotter the battery, the more quickly the retention capacity dropped.

Some existing information handling systems include multiple temperature sensors and may determine, as part of a battery control plan, whether any of the temperature values obtained from those multiple temperature sensors are over or under specified threshold values. In at least some embodiments of the present disclosure, an information handling system may apply a battery temperature range function to temperature measurements obtained by multiple temperature sensors in the system to calculate a battery temperature distribution value ($\Delta T$). In some embodiments, the battery temperature distribution value may be based on a difference between the maximum and minimum temperature measurements associated with a battery. In some embodiments, the information handling system may incorporate a battery temperature distribution value as one of the parameters considered as part of an enhanced battery control plan. In some such embodiments, if the battery temperature distribution value is greater than a predetermined threshold value (whether or not any of the individual temperature measurements are out of normal range), this may affect the operation of the battery. For example, if the battery temperature distribution value is too high, this may indicate that a charging rate should be reduced or that discharging should be limited until and unless the battery temperature distribution value returns to a range in which the particular battery operation is safe and/or efficient. This approach may be further illustrated by the example conditions and responses shown in Table 1 below.

TABLE 1

| Example use of battery temperature distribution in battery management | |
|---|---|
| condition | response |
| $\Delta T < a$ | monitor operations |
| $a < \Delta T < b$ | limit operations |
| $\Delta T > b$ | suspend operations |

In the example embodiment illustrated in Table 1, while the battery temperature distribution value is less than a predetermined first threshold value, normal battery operations may proceed, along with monitoring of the battery temperature distribution value. If and when the battery temperature distribution value lies between the first threshold value and a second threshold value that is greater than the first threshold value, one or more battery operations may be limited. In this case, monitoring of the battery temperature distribution value may continue. If and when the battery temperature distribution value exceeds the second threshold value, one or more battery operations may be suspended altogether. However, monitoring of the battery temperature distribution value may continue. If and when the battery temperature distribution value drops below the second threshold value, limited battery operations may resume. Similarly, if and when the battery temperature distribution value drops below the first threshold value, normal battery operations may resume.

In some embodiments, an enhanced battery control plan may consider both the magnitude of the battery temperature distribution value and whether temperature measurements for the battery indicate that the battery would be considered cold or hot (e.g., when at least one of the temperature measurements indicates that the battery is operating outside of a normal temperature range). In some embodiments, a lookup table may be used to map battery temperature measurements and/or battery temperature distribution value against ranges of these value to determine battery control parameters to be adjusted or other battery management actions to be taken. For example, Lithium-ion intercalation is more sensitive at low temperature, so a lookup table for battery temperature and/or battery temperature distribution values may indicate that tighter controls should be applied when the battery is cold. In another example, a battery management function may indicate that discharge pulses (e.g., in a turbo mode) should be more tightly controlled when there is a large battery temperature distribution value and the battery is hot. In some embodiments, a battery temperature distribution value may be calculated based on a difference between a battery temperature measurement and ambient temperature, or on a difference between a battery temperature measurement and another reference temperature for the system. In some embodiments, an enhanced battery control plan may consider the rate of change of the battery temperature distribution value, instead of or in addition to its magnitude, to control various operations of the battery.

Particular embodiments are best understood by reference to FIGS. 1-4 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Furthermore, information handling system 100 is shown removably coupled to a DC line power 146 that may supply electrical power for operation of information handling system 100, including for charging internal battery 171, from one or more external power sources.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (i SCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170. Thus, EC processor 182 may have access to EC memory 184, which may store EC firmware 186, representing instructions executable by EC processor 182. As shown, EC firmware 186 includes battery management 185, which may represent executable code for controlling various operating parameters of internal battery 170 dependent on battery temperature distribution, as disclosed herein.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

In the illustrated embodiment, embedded controller 180 may be responsible for managing electrical power connections between internal or external power sources and other portions of portable information handling system 100. In other embodiments, power control may be implemented by a separate power controller external to embedded controller 180. For example, a variable power bus 142 may supply electrical power to portable information handling system 100, in which case embedded controller 180, or a separate power controller, may determine whether the electrical power is used to charge internal battery 171 or to directly power portable information handling system 100. In another example, embedded controller 180, or a separate power controller, may manage so-called 'soft start up' of portable information handling system 100, such as when portable information handling system 100 awakes from a low power state, such as sleep mode, by determining a source of power during the low power state and managing operation of portable information handling system 100 during the low power state. In the illustrated embodiment, DC power and control 144 may represent suitable connections between embedded controller 180 and internal BMU 170, for example. This may include connections for providing data obtained from one or more temperature sensors within, or associated with, internal battery 171 as a basis for calculating a battery temperature distribution value. In one example embodiment, embedded controller 180 may include four temperature sensor inputs. In other embodiments, embedded controller 180 may include any suitable number of temperature sensor inputs. It is noted that in some embodiments, at least certain portions of power control may be implemented using EC firmware 186, such as specialized executable instructions for power management and control.

As illustrated in FIG. 1, portable information handling system 100 may include a battery management unit (BMU) 170 that controls operation of internal battery 171. In particular implementations, BMU 170 may be embedded within a respective battery whose operation BMU 170 controls. For example, internal BMU 170 within portable information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, internal battery 171 illustrated in FIG. 1 may be considered to be discharged when an SOC of the battery corresponds to an SOC that is below a predetermined threshold percentage or amount below the 100% charge level given by the TOC voltage, such as below a 5% charge level in one example. Internal battery 171 may be considered to be charged, i.e., at least partially charged, when the SOC for the battery corresponds to an SOC that is above a first predetermined threshold percentage or amount below the 100% charge level given by the TOC voltage, such as above the 25% charge level in one example. Internal battery 171 may be considered to be fully charged when the SOC of the battery corresponds to an SOC that is above a second predetermined threshold percentage or amount below the 100% charge level given by the TOC voltage, such as above the 95% charge level for example. Internal battery 171 may be considered to be at least partially discharged when the SOC of the battery corresponds to an SOC that is below the 100% charge level. The parameters for specifying an SOC described above are examples and may be modified using different values in different embodiments.

In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. For example, internal battery 171 may include three or more cells in various configurations. In some embodiments, internal battery 171 may include one or more cells based on any one of a variety of Lithium-ion electrochemistries, or one or more cells based a different electrochemistry than Lithium-ion.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. One or more temperature sensors may be located in proximity to the battery cells to provide accurate indications of the temperature at different locations within battery 171. The fuse may be a safety element for limiting current flowing through the main power circuit. The power switch may be an electronically controlled switching element that closes or opens the main power circuit, and thereby allows the battery to operate for charging or discharging.

In FIG. 1, BMU 170 may include a charging unit (CU) 174 that may control charging cycles for internal battery 171 and may apply a TOC voltage as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters, temperature values, or other operating parameters received from one or more battery cells in internal battery 171.

In some embodiments, parameters monitored by a BMU 170 may include a charging current, a voltage, a battery impedance, and a temperature associated with internal battery 171. More specifically, the parameters monitored by the BMU 170 may include any or all of the cell configuration and chemistry of battery cells within internal battery 171, the total voltage of internal battery 171, the voltages of individual battery cells in internal battery 171, minimum or maximum cell voltages, the average temperature of internal battery 171 as a whole, the temperatures of individual battery cells in internal battery 171, a battery temperature distribution value as described herein, the SOC of internal battery 171, the depth of discharge of internal battery 171, the current flowing into internal battery 171, the current flowing out of internal battery 171, and any other measurement of the overall condition of internal battery 171, in various embodiments. In some embodiments, monitoring the SOC may include continuous or periodic monitoring of output current, voltage, or both for internal battery 171. In some cases, Coulomb counting, in which the charge delivered or stored by a battery is tracked, is used for monitoring of internal battery 171. In some embodiments, a battery temperature may be monitored through the use of periodic voltage measurements, a thermometer, or another type of sensor or method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to battery management 185 to implement the methods disclosed herein for battery management using battery temperature distribution. In other embodiments, BMU 170 may be configured to implement the methods disclosed herein for battery management using battery temperature distribution.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. For example, a remaining battery capacity may be measured in mWh by BMU 170. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof.

In certain embodiments, BMU 170 may include a processor and memory (not shown). The memory may store instructions executable by the processor to perform one or more methods for obtaining and calculating values related to the operation and charging of a battery and for controlling the operation and charging of the battery. The memory may also store data, obtained and calculated values, thresholds, and parameters related to the methods described herein.

Figure 2:
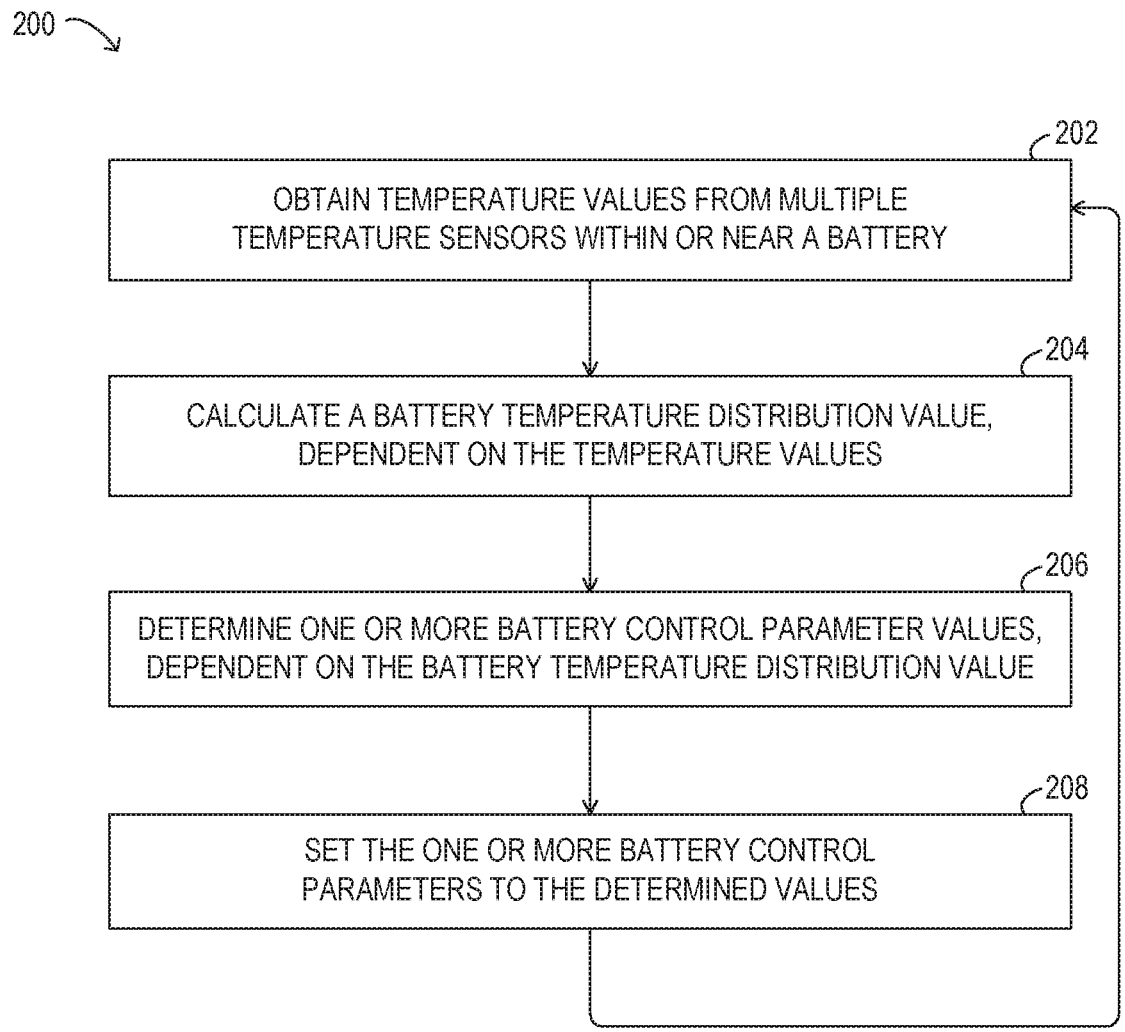
FIG. 2 is flow diagram illustrating selected elements of a method for battery management using battery temperature distribution.

Referring now to FIG. 2, selected elements of an embodiment of method 200 for battery management using battery temperature distribution, as described herein, is depicted in flowchart form. Method 200 may be performed using portable information handling system 100 (see FIG. 1) and, in particular, by internal BMU 170 or by battery management 185 within EC controller 180, to control the operation of internal battery 171. For example, BMU 170 or battery management 185 may be, or include, a battery management microcontroller for portable electronics that is designed to accept multiple temperature inputs. For example, one commercially available battery management microcontroller is designed to accept up to four temperature inputs. In some embodiments, the battery management methods described herein may take advantage of such hardware, if available in the information handling system. Method 200 may be performed repeatedly or continuously to adjust various battery control parameters for internal battery 171 based, at least in part, on battery temperature distribution. It is noted that certain operations described in method 200 may be optional or may be rearranged in different embodiments.

Method 200 may begin at, step 202, with obtaining temperature values from multiple temperature sensors within or near a battery. For example, multiple temperature sensors may be distributed within information handling system 100 or internal battery 171 such that they are located in different positions across the surface of the battery (e.g., adjacent to or in contact with the surface of the battery). As previously noted, a temperature sensor for measuring a temperature associated with a battery may determine the battery temperature using periodic voltage measurements, a thermometer, or another type of sensor or method to detect variations in temperature. In some embodiments, each of the multiple temperature sensors may be positioned near a respective one of multiple cells of internal battery 171 such that it obtains a temperature value associated with that cell. In other embodiments, each of the multiple temperature sensors may be located at different positions with respect to a respective functional element of (or associated with) internal battery 171. For example, different sensors may be placed near and far from an air vent, near and far from a wireless charging coil, or near and far from a heat generating functional element, such as a processor or memory. The method may include, at 204, calculating a battery temperature distribution value, dependent on the received temperature values. For example, in some embodiments, calculating a battery temperature distribution value may include determining a difference between the maximum received temperature value and the minimum received temperature value. In some embodiments, calculating a battery temperature distribution value may include determining a difference between one of the received temperature values and a reference temperature value, which may be an ambient temperature value. Calculating the battery temperature distribution value may also include determining a rate of change in the difference between the two temperature values.

Method 200 may include, at 206, determining one or more battery control parameter values, dependent on the calculated battery temperature distribution value. For example, the method may include determining a value for a battery operating mode parameter indicating that the battery is to operate in a charge mode, determining a value for a battery operating mode parameter indicating that the battery is to operate in a discharge mode, determining a value of a parameter controlling a charge rate for the battery, determining a value of a parameter controlling a discharge rate for the battery, determining a value of a parameter controlling a charging voltage for the battery, or determining a value of a parameter controlling a charging current for the battery. In some embodiments, determining values for the battery control parameters may include determining whether or not the difference between the two temperature values lies between a first predetermined threshold difference value and a second predetermined threshold difference value. In some embodiments, determining values for the battery control parameters may include determining whether or not the difference between the two temperature values exceeds a predetermined threshold difference value. In some embodiments, determining values for the battery control parameters may include determining whether or not the received temperatures values lie outside a predetermined temperature range. At 208, the method may include setting the one or more battery control parameters to the determined values. In some embodiments, this may include passing the determined values of the battery control parameters to internal BMU 170 for controlling the operation of internal battery 171.

In the example embodiment illustrated in FIG. 2, method 200 may be repeated, either continuously or periodically, to obtain and analyze temperature values associated with a battery, to calculate a battery temperature distribution value based on the temperature values, to determine values of battery control parameters dependent on the calculated battery temperature distribution value, and to set the battery control parameters to the determined values as conditions change over time. In some embodiments, the determination of the battery control values may also be dependent on one or more individual temperature values, on an aggregate of the temperature values, on the rate of change of the temperature values or of the differences between pairs of temperature values, or on whether the temperature values lie within or outside a predefined range of temperatures associated with safe or efficient operation of the battery in a particular mode (e.g., a charging mode or a discharging mode). For example, the determination of the battery control values may be dependent on both the calculated battery temperature distribution and on whether the battery is currently considered to be running hot, running cold, or running within a normal temperature range for a particular operating mode.

Figure 3:
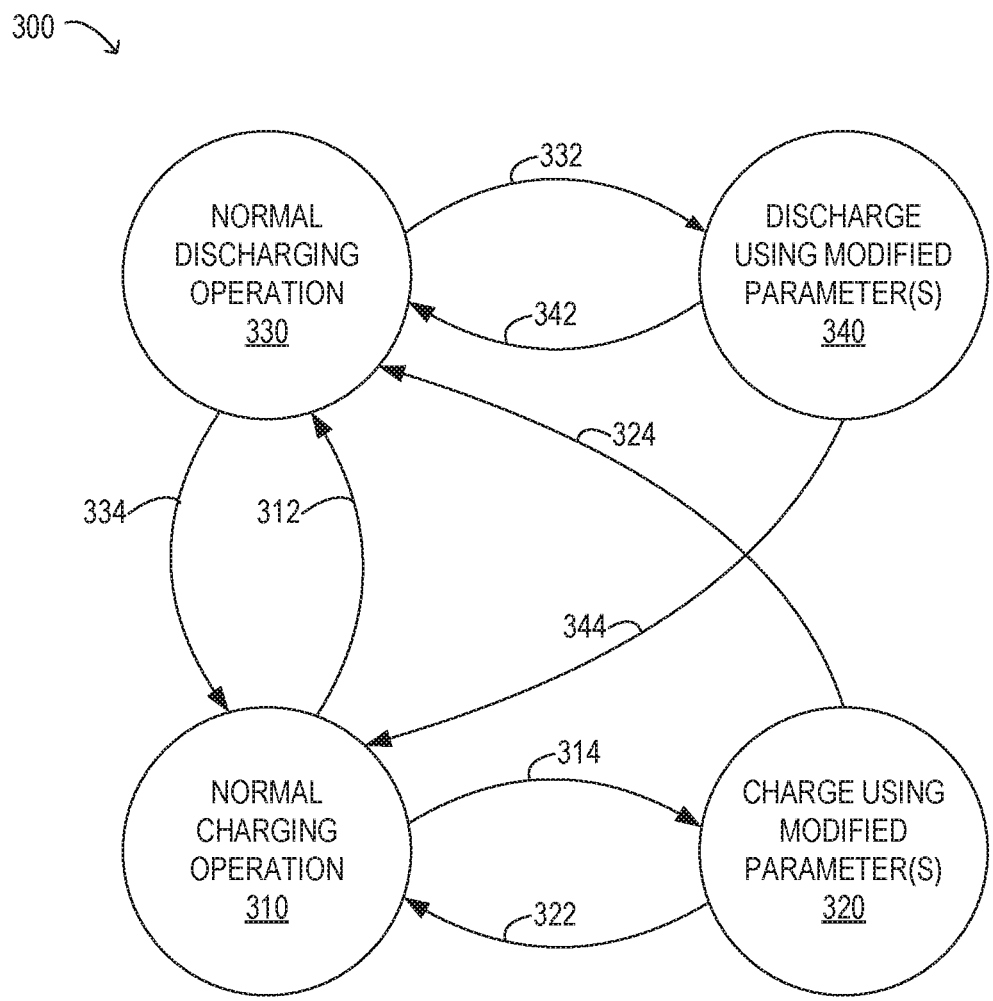
FIG. 3 illustrates a state diagram depicting an embodiment of an embedded controller for battery management using battery temperature distribution.

FIG. 3 illustrates a state diagram 300 depicting an embodiment of an embedded controller for battery management using battery temperature distribution. As noted above, some battery management microcontrollers for portable electronics are designed to accept multiple temperature inputs. For example, one commercially available battery management microcontroller is designed to accept up to four temperature inputs. In some embodiments, a BMU or an embedded controller that implements state diagram 300 for battery management may take advantage of such hardware, if available in the information handling system. In the illustrated embodiment, it is assumed that an external power source is available for performing the charging operations.

In this example embodiment, state 310 represents a state in which the battery is performing a normal charging operation, e.g., a state in which the battery control parameter values are set to standard or default values for a charging operation. Similarly, state 330 represents a state in which the battery is performing normal discharging operations and in which the battery control parameter values are set to standard or default values for a discharging operation. In this example embodiment, state 320 represents a state in which the battery is performing a charging operation using battery control parameter values that have been modified from the standard or default values used for a normal charging operation such as that represented by state 310. For example, the battery control parameters for which the value has been modified may include a parameter controlling the rate of charge for the battery, a parameter controlling the charging voltage for the battery, or a parameter controlling the charging current for the battery. In some embodiments, a battery control parameter value may be modified causing charging of the battery to be suspended altogether. In this example embodiment, state 340 represents a state in which the battery is performing a discharging operation using battery control parameter values that have been modified from the standard or default values used for a normal discharging operation such as that represented by state 330. For example, in this state, discharge pulses (e.g., in a turbo mode) may be more tightly controlled based on the calculation of a large battery temperature distribution value and a determination that the battery is hot. In some embodiments, a battery control parameter value may be modified causing discharging of the battery to be suspended altogether.

In the descriptions of the state transition trigger conditions that follow, the term "mode change" refers to a condition in which there has been a request to change from a charging mode to a discharging mode, or vice versa. The term "ΔT okay" refers to a condition in which a calculated battery temperature distribution value meets predefined criteria for safely or efficiently operating in the current operating mode. Conversely, the term "ΔT out-of-range" refers to a condition in which a calculated battery temperature distribution value does not meet predefined criteria for safely or efficiently operating in the current operating mode. The term "T okay" refers to a condition in which the temperature measurements meet predefined criteria for safely or efficiently operating in the current operating mode. Conversely, the term "T out-of-range" refers to a condition in which one or more of the temperature measurements does not meet predefined criteria for safely or efficiently operating in the current operating mode.

In the illustrated embodiment, a move from state 310 ("normal charging operation") to state 330 ("normal discharging operation") may be initiated based on trigger condition 312. Here, trigger condition 312=(mode change) AND (T okay) AND (ΔT okay), and the requested change is from a charging mode to a discharging mode. In the illustrated embodiment, a move from state 310 ("normal charging operation") to state 320 ("charge using modified parameters") may be initiated based on trigger condition 314. Here, trigger condition 314=(T out-of-range) OR (ΔT out-of-range), and the battery remains in a charging mode. In the illustrated embodiment, a move from state 320 ("charge using modified parameters") to state 310 ("normal charging operation") may be initiated based on trigger condition 322. Here, trigger condition 322=(T okay) AND (ΔT okay), and the battery remains in a charging mode. In the illustrated embodiment, a move from state 320 ("charge using modified parameters") to state 330 ("normal discharging operation") may be initiated based on trigger condition 324. Here, trigger condition 324=(mode change), and the requested change is from a charging mode to a discharging mode.

In the illustrated embodiment, a move from state 330 ("normal discharging operation") to state 310 ("normal charging operation") may be initiated based on trigger condition 334. Here, trigger condition 334=(mode change) AND (T okay) AND (ΔT okay), and the requested change is from a discharging mode to charging mode. In the illustrated embodiment, a move from state 330 ("normal discharging operation") to state 340 ("discharge using modified parameters") may be initiated based on trigger condition 332. Here, trigger condition 332=(T out-of-range) OR (ΔT out-of-range), and the battery remains in a discharging mode. In the illustrated embodiment, a move from state 340 ("discharge using modified parameters") to state 330 ("normal discharging operation") may be initiated based on trigger condition 342. Here, trigger condition 342=(T okay) AND (ΔT okay), and the battery remains in a discharging mode. In the illustrated embodiment, a move from state 340 ("discharge using modified parameters") to state 310 ("normal charging operation") may be initiated based on trigger condition 344. Here, trigger condition 344=(mode change), and the requested change is from a discharging mode to a charging mode.

In other embodiments, more, fewer, or different conditions may trigger transitions between states 310, 320, 330, and 340.

Note that in some embodiments of the present disclosure, AC line power may be available as an external power source. In such embodiments, when the battery is fully charged, it may be in a fifth state in which it is neither being charged nor discharged, rather than in one of the four states illustrated in FIG. 3. In this fifth state, the battery may, periodically or upon request, provide information to a BMU or embedded controller configured to implement the battery management techniques described herein, including those based on battery temperature distribution. For example, the battery may provide information indicating that the operation of the system is inducing a significant thermal imbalance over the battery that could lead to limited operation during a future battery discharge event (e.g., when a connection to AC line power is no longer present). Any information collected while the battery is in the fifth state may be taken into consideration in determining when, whether, and how various battery control parameters should be modified when the battery transitions from the fifth state to another one of the states illustrated in FIG. 3. For example, information collected while the battery is in the fifth state may be used to determine the state to which the battery transitions when a connection to AC line power is no longer present (e.g., state 330 or state 340). In another example, information collected while the battery is in the fifth state may be taken into consideration (e.g., as historical information or a learned pattern of behavior) in determining when, whether, and how various battery control parameters should be modified when the battery transitions from a charging mode to a discharging mode, or vice versa.

Figure 4:
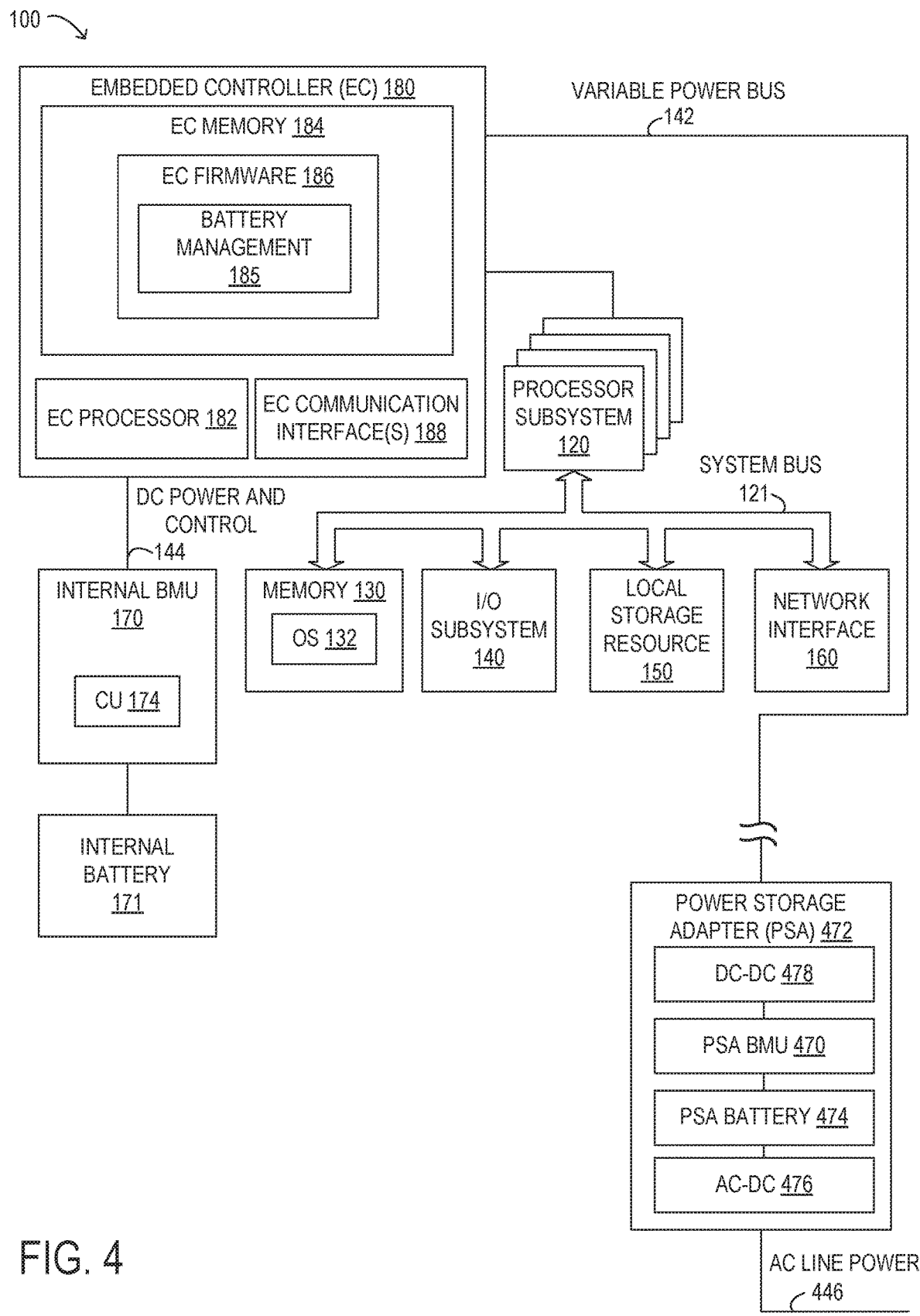
FIG. 4 is a block diagram illustrating selected elements of an embodiment of a portable information handling system and a power storage adapter coupled to the portable information handling system.

FIG. 4 is a block diagram illustrating selected elements of an embodiment of a portable information handling system and a power storage adapter (PSA) coupled to the portable information handling system. In this example embodiment, information handling system 100 is similar to information handling system 100 illustrated in FIG. 1. In FIG. 4, power storage adapter 472 includes a PSA battery 474 and a PSA BMU 470. In some embodiments, PSA battery 474 may be similar to internal battery 171, and may be controlled using battery control parameters similar to those discussed above in reference to internal battery 171. In addition, PSA BMU 470 may be similar to internal BMU 170. For example, PSA BMU 470 may monitor information associated with, and control charging operations of, PSA battery 474 in a manner similar to that in which internal BMU 170 monitors information associated with, and controls charging operations of, internal battery 171. In the illustrated example, power storage adapter 472 is coupled to portable information handling system 100 via variable power bus (VPB) 142, as described above with respect to FIG. 1. Additionally, power storage adapter 472 is externally connected to AC line power 446.

In FIG. 4, power storage adapter 472 is shown receiving AC line power 446 as an external power source. AC line power 446 may represent a connection to line power, such as using a standard line power cable. In some embodiments, AC line power 446 may be a removable connection, such as a cable that plugs into line power in a wall socket, and plugs into a corresponding receptacle included with power storage adapter 472. Also included within power storage adapter 472 in FIG. 4 is AC-DC converter 476. AC-DC converter 476 may receive alternating current (AC) from AC line power 446 and may output one or more DC voltages for supplying electrical power to other components in power storage adapter 472. For example, an output DC voltage from AC-DC converter 476 may be supplied to PSA battery 474 for charging purposes. An output DC voltage from AC-DC converter 476 may be supplied to a DC-DC converter 478, which may then generate one or more other DC voltages. Also, an output DC voltage from AC-DC converter 476 may be directly supplied to variable power bus 142, such as to fulfil a power contract.

In operation, power storage adapter 472 may supply portable information handling system 100 with electrical power, which may be governed by a power delivery contract. Under certain conditions, the power delivery contract may not be desirable to maintain optimal efficiency and long run times under battery power. For example, when power storage adapter 472 is not connected to AC line power 446, PSA battery 474 is available as a power source for supplying electrical power to portable information handling system 100. Furthermore, during certain charging regimes, such as when portable information handling system 100 is in a low power state and is drawing very little current to charge internal battery 171, portable information handling system 100 may draw substantially less electrical power than specified in the power delivery contract. When portable information handling system 100 draws a relatively low electrical power, such as less than about 1 Watt, the efficiency for supplying electrical power from internal battery 171 is substantially reduced, because certain losses due to inefficiency, such as thermal losses, will comprise a much greater relative portion of the total output power supplied by power storage adapter 472.

Therefore, when power storage adapter 472 is not connected to AC line power 446 and the electrical power actually supplied to portable information handling system 100 is relatively low, power storage adapter 472 may independently decide to terminate the power storage contract and to wait until such time as internal battery 171 will draw greater electrical power for charging, for example, when internal battery 171 reaches a state of charge that is less than a recharging state of charge, and will draw greater amounts of electrical power from power storage adapter, which will be more efficient.

In some embodiments, the elements of power storage adapter 472 may be arranged such that AC-DC converter 476 is on one end AC-DC converter 476, DC-DC converter 478 is on the other end, and PSA battery 474, which may include multiple battery cells, is positioned between AC-DC converter 476 and DC-DC converter 478. In such embodiments, temperature measurements associated with the cells of PSA battery 474 that are near heat generating elements, such as AC-DC converter 476, may be much higher than those associated with other cells of PSA battery 474. In some embodiments, even if there is a thermal barrier between PSA battery 474 and other elements of power storage adapter 472, there may be significant differences between the respective temperatures obtained by sensors near different ones of the cells of PSA battery 474.

In some embodiments, the methods described herein for battery management using battery temperature distribution may be implanted with respect to PSA battery 474 instead of, or in addition to, internal battery 171. For example, in some embodiments, multiple temperature sensors may be placed within, or in proximity to, PSA battery 474. In some embodiments, method 200 illustrated in FIG. 2 may be performed by PSA BMU 470 to manage PSA battery 474 dependent on a battery temperature distribution calculated from measurements taken by the PSA battery sensors. In some embodiments, PSA BMU 470 may implement a state machine such as that illustrated as state diagram 300 in FIG. 3 to manage PSA battery 474 dependent on a battery temperature distribution calculated from measurements taken by the PSA battery sensors. The state machine may include a fifth state, as described above. In some embodiments, power storage adapter 472 may include an embedded controller similar to embedded controller 180, which may perform method 200 illustrated in FIG. 2 to manage PSA battery 474 dependent on a battery temperature distribution calculated from measurements taken by the PSA battery sensors. In some embodiments, measurement obtained from PSA battery sensors may be provided to information handling system 100 (e.g., over variable power bus 142), and embedded controller 180 may perform method 200 illustrated in FIG. 2 or implement state diagram 300 illustrated in FIG. 3 to manage PSA battery 474 dependent on a battery temperature distribution calculated from measurements taken by the PSA battery sensors. The state machine may include a fifth state, as described above.

As disclosed herein, a battery control method incorporating battery temperature distribution values may provide for improved battery performance and safe operations. For example, an information handling system may include a main processor, a battery, multiple temperature sensors for obtaining temperature values associated with the battery, and an embedded controller including a processor, and memory media accessible to the processor. The memory media may store instructions executable by the processor for receiving a respective temperature value from each of the temperature sensors and calculating a battery temperature distribution value dependent on the received temperature values, including determining a difference between two temperature values. For example, a battery temperature distribution value may be calculated as a difference between a maximum temperature value among the received temperature values and a minimum temperature value among the received temperature values or as a difference between one of the received temperature values and a reference temperature value. The battery may include multiple battery cells, and each of the temperature sensors may be positioned to obtain a temperature value associated with a respective one of the battery cells.

The instructions may be further executable for determining a respective value for each of one or more battery control parameters dependent on the battery temperature distribution value, and setting each of the battery control parameters to the determined value. For example, determining a respective value for each of the one or more battery control parameters may include determining a value for a battery operating mode parameter indicating that the battery is to operate in a charge mode, determining a value for a battery operating mode parameter indicating that the battery is to operate in a discharge mode, determining a value of a parameter controlling a charge rate for the battery, determining a value of a parameter controlling a discharge rate for the battery, determining a value of a parameter controlling a charging voltage for the battery, or determining a value of a parameter controlling a charging current for the battery, in different embodiments. Determining the control parameters values may be further dependent on the rate of change of the difference between the two temperature values, or on whether the received temperatures and/or the temperature difference lie outside a predetermined range. In some embodiments, setting the battery control parameters to the determined values may include passing the determined values of the battery control parameters to a BMU that is responsible, at least in part, for controlling the operation of the battery.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a main processor;
   a battery;
   a plurality of temperature sensors for obtaining temperature values associated with the battery;
   an embedded controller (EC) comprising an EC processor; and
   memory media accessible to the EC processor and storing instructions executable by the EC processor for:
   receiving a respective temperature value from each of the plurality of temperature sensors, each of the temperature values being associated with a different portion of the battery;
   calculating a battery temperature distribution value dependent on the received temperature values, the calculating comprising determining a difference between two temperature values, the two temperature values including one of the received temperature values and a reference temperature value or two of the received temperature values;
   determining a rate of change in the difference between the two temperature values;
   determining a respective value for each of one or more battery control parameters dependent on both a magnitude of the battery temperature distribution value and the determined rate of change in the difference between the two temperature values; and
   setting each of the one or more battery control parameters to the determined respective value.

2. The information handling system of claim 1, wherein calculating the battery temperature distribution value comprises determining a difference between a maximum temperature value among the received temperature values and a minimum temperature value among the received temperature values.

3. The information handling system of claim 1, wherein calculating the battery temperature distribution value comprises determining a difference between one of the received temperature values and a reference temperature value representing an ambient temperature.

4. The information handling system of claim 1, wherein determining a respective value for each of the one or more battery control parameters is further dependent on whether a magnitude of the difference between the two temperature values lies between a first predetermined threshold difference value and a second predetermined threshold difference value.

5. The information handling system of claim 1, wherein determining a respective value for each of the one or more battery control parameters is further dependent on whether a magnitude of the difference between the two temperature values exceeds a predetermined threshold difference value.

6. The information handling system of claim 1, wherein determining a respective value for each of the one or more battery control parameters comprises at least one of:
   determining a value for a battery operating mode parameter indicating that the battery is to operate in a charge mode;
   determining a value for a battery operating mode parameter indicating that the battery is to operate in a discharge mode;
   determining a value of a parameter controlling a charge rate for the battery;
   determining a value of a parameter controlling a discharge rate for the battery;
   determining a value of a parameter controlling a charging voltage for the battery; and
   determining a value of a parameter controlling a charging current for the battery.

7. The information handling system of claim 1, wherein determining a respective value for each of the one or more battery control parameters is further dependent on whether the received temperatures values lie outside a predetermined temperature range.

8. The information handling system of claim 1, wherein the sensors are distributed with respect to their positions relative to a surface of the battery.

9. The information handling system of claim 1, wherein:
   the battery comprises multiple battery cells; and
   each of the plurality of sensors is positioned to obtain a temperature value associated with a respective one of the battery cells.

10. A method for battery management, the method comprising:
    receiving a respective temperature value associated with a different portion of a battery from each of a plurality of temperature sensors;
    calculating a battery temperature distribution value dependent on the received temperature values, the calculating comprising determining a difference between two temperature values, the two temperature values including one of the received temperature values and a reference temperature value or two of the received temperature values;

determining a rate of change in the difference between the two temperature values;

determining a respective value for each of one or more battery control parameters dependent on both a magnitude of the battery temperature distribution value and the determined rate of change in the difference between the two temperature values; and setting each of the one or more battery control parameters to the determined respective value.

11. The method of claim 10, wherein determining a respective value for each of the one or more battery control parameters further comprises determining whether a magnitude of the difference between the two temperature values lies between a first predetermined threshold difference value and a second predetermined threshold difference value.

12. The method of claim 10, wherein determining a respective value for each of the one or more battery control parameters further comprises determining whether a magnitude of the difference between the two temperature values exceeds a predetermined threshold difference value.

13. The method of claim 10, wherein determining a respective value for each of the one or more battery control parameters further comprises determining whether the received temperatures values lie outside a predetermined temperature range.

14. The method of claim 10, wherein the battery is an internal battery of an information handling system or a battery within a power storage adapter coupled to the information handling system.

15. Non-transitory computer readable memory media storing instructions executable by a processor for:

receiving a respective temperature value associated with a different portion of a battery from each of a plurality of temperature sensors;

calculating a battery temperature distribution value dependent on the received temperature values, the calculating comprising determining a difference between two temperature values, the two temperature values including one of the received temperature values and a reference temperature value or two of the received temperature values;

determining a rate of change in the difference between the two temperature values;

determining a respective value for each of one or more battery control parameters dependent on both a magnitude of the battery temperature distribution value and the determined rate of change in the difference between the two temperature values; and setting each of the one or more battery control parameters to the determined respective value.

16. The memory media of claim 15, wherein determining a respective value for each of the one or more battery control parameters further comprises determining whether a magnitude of the difference between the two temperature values exceeds a predetermined threshold difference value.

17. The memory media of claim 15, wherein determining a respective value for each of the one or more battery control parameters further comprises determining whether the received temperatures values lie outside a predetermined temperature range.

* * * * *